United States Patent
Luo et al.

(10) Patent No.: US 12,352,967 B2
(45) Date of Patent: Jul. 8, 2025

(54) HEAD-MOUNTED AUGMENTED REALITY STEREO VISION OPTICAL FILM ON GLASSES

(71) Applicant: Industrial Technology Research Institute, Hsinchu (TW)

(72) Inventors: Cheng-Jhih Luo, Hualien County (TW); Chia-Hsin Chao, Hsinchu County (TW); Wei-Cheng Chao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 639 days.

(21) Appl. No.: 17/563,105

(22) Filed: Dec. 28, 2021

(65) Prior Publication Data

US 2023/0185092 A1    Jun. 15, 2023

(30) Foreign Application Priority Data

Dec. 15, 2021  (TW) .................................. 110146849

(51) Int. Cl.
 *G02B 27/01*  (2006.01)
 *G02B 1/00*  (2006.01)
 *G02B 27/00*  (2006.01)
 *G02B 30/26*  (2020.01)

(52) U.S. Cl.
 CPC ......... *G02B 27/0172* (2013.01); *G02B 1/002* (2013.01); *G02B 27/0093* (2013.01); *G02B 30/26* (2020.01); *G02B 2027/0178* (2013.01)

(58) Field of Classification Search
 CPC ..... G02B 2027/0105–0198; G02B 27/00–648; G02B 30/00–60; G02B 1/00–18
 See application file for complete search history.

(56) References Cited

U.S. PATENT DOCUMENTS

| | | | |
|---|---|---|---|
| 9,977,496 B2 | 5/2018 | Maltz | |
| 10,564,330 B2 | 2/2020 | Ahmed et al. | |
| 10,652,529 B2 | 5/2020 | Lamkin et al. | |
| 10,761,328 B2 | 9/2020 | Hu | |
| 10,838,492 B1 * | 11/2020 | Whitmire | G02B 27/0093 |

(Continued)

FOREIGN PATENT DOCUMENTS

| | | |
|---|---|---|
| CN | 110488494 | 11/2019 |
| CN | 113126298 | 7/2021 |

(Continued)

OTHER PUBLICATIONS

"Office Action of Taiwan Counterpart Application", issued on Dec. 6, 2022, p. 1-p. 7.

(Continued)

*Primary Examiner* — Christopher A Lamb, II
(74) *Attorney, Agent, or Firm* — JCIPRNET

(57) ABSTRACT

A head-mounted augmented reality stereo vision optical film on glasses, including a light-transmitting display layer, an optical projection layer, and an eyeball tracking layer, is provided. The light-transmitting display layer includes multiple pixel units. The optical projection layer includes multiple lens units. One of the lens units is configured to correspond to at least one of the pixel units. The eyeball tracking layer includes multiple micro-sensing elements.

16 Claims, 12 Drawing Sheets

(56) References Cited

U.S. PATENT DOCUMENTS

| | | | |
|---|---|---|---|
| 10,979,635 B2 | 4/2021 | Hu et al. | |
| 11,073,906 B1 | 7/2021 | Hudman et al. | |
| 2004/0234417 A1* | 11/2004 | Schienle | G01N 21/6454 |
| | | | 422/82.08 |
| 2017/0039904 A1* | 2/2017 | Jepsen | G09G 5/003 |
| 2019/0057957 A1* | 2/2019 | Xie | G01S 17/86 |
| 2019/0171026 A1* | 6/2019 | Parsons | G02B 5/26 |
| 2020/0089318 A1 | 3/2020 | Brennan et al. | |
| 2020/0132992 A1 | 4/2020 | Ouderkirk et al. | |
| 2020/0249318 A1* | 8/2020 | Henderson | G01S 7/4865 |
| 2020/0266252 A1 | 8/2020 | Cancel Olmo et al. | |
| 2021/0003900 A1 | 1/2021 | Chen | |
| 2021/0005681 A1 | 1/2021 | Chen | |

FOREIGN PATENT DOCUMENTS

| | | |
|---|---|---|
| CN | 110208947 | 10/2021 |
| TW | 201905539 | 2/2019 |
| TW | 201937234 | 9/2019 |
| TW | 201945791 | 12/2019 |
| TW | I683136 | 1/2020 |
| TW | I717890 | 2/2021 |
| TW | I746370 | 11/2021 |

OTHER PUBLICATIONS

"Office Action of Taiwan Related Application, Application No. 111145301", issued on Jun. 13, 2023, p. 1-p. 7.

* cited by examiner

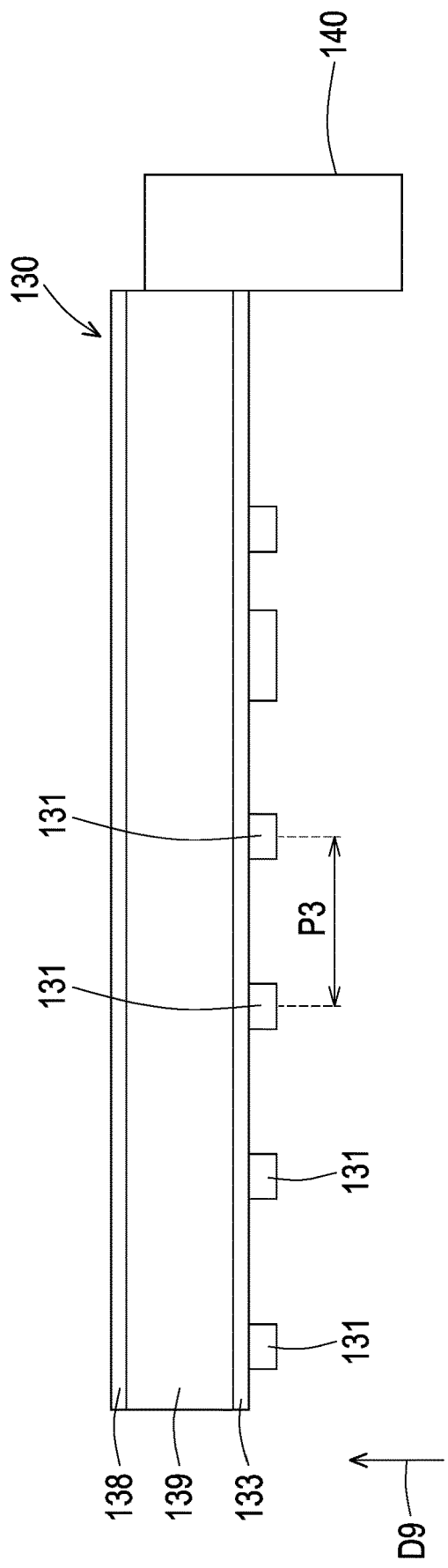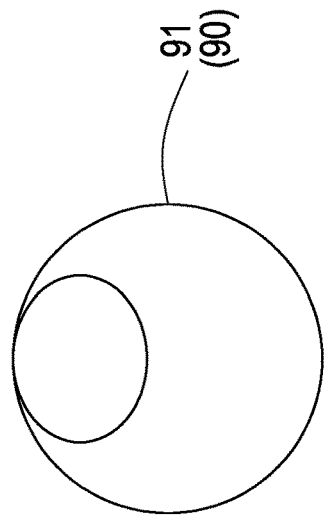
FIG. 4A

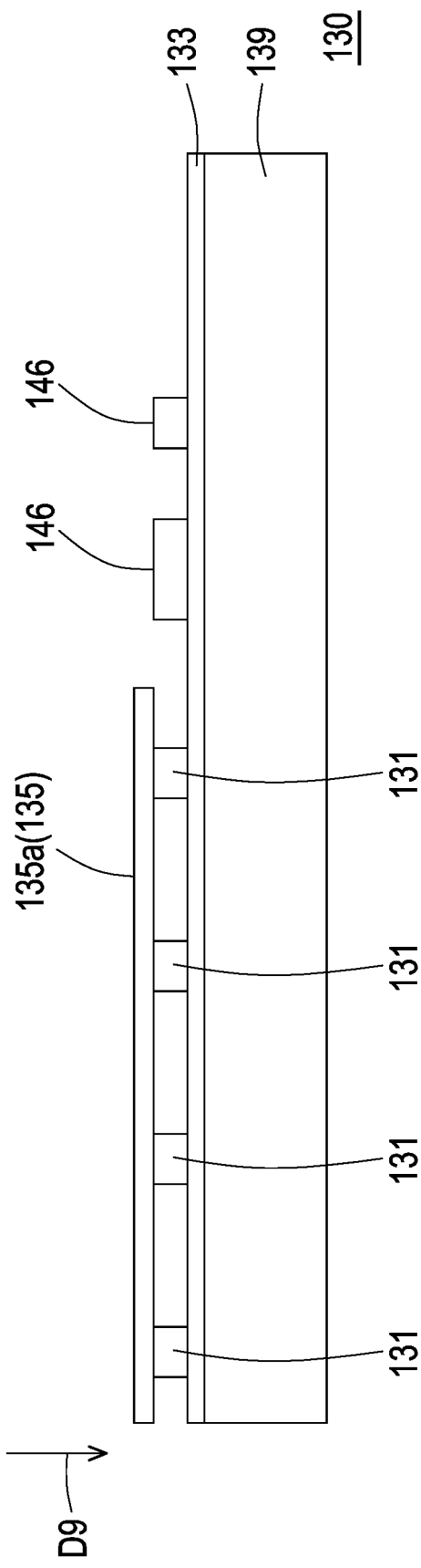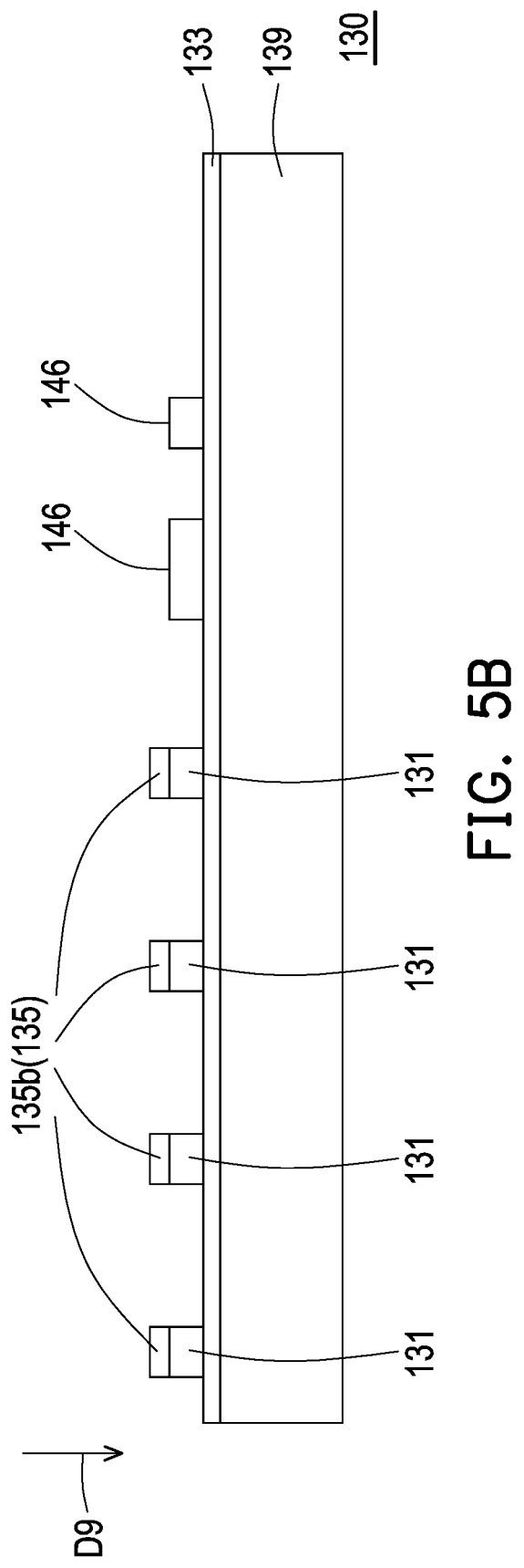

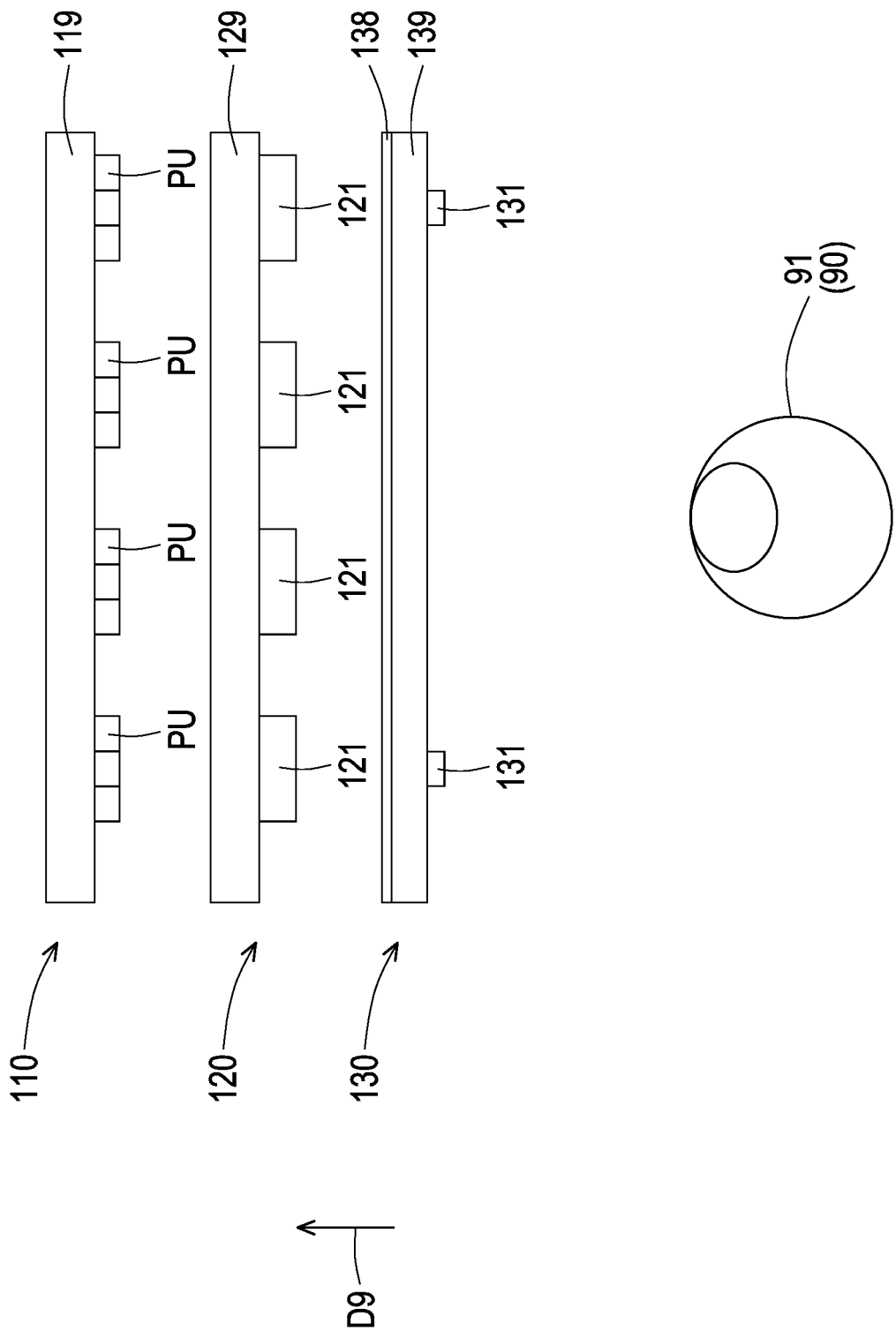

HEAD-MOUNTED AUGMENTED REALITY STEREO VISION OPTICAL FILM ON GLASSES

CROSS-REFERENCE TO RELATED APPLICATION

This application claims the priority benefit of Taiwan application serial no. 110146849, filed on Dec. 15, 2021. The entirety of the above-mentioned patent application is hereby incorporated by reference herein and made a part of this specification.

BACKGROUND

Technical Field

The disclosure relates to an imaging system, and particularly relates to a head-mounted augmented reality stereo vision optical film on glasses.

Description of Related Art

In order to provide higher-quality audio-visual effects, technologies such as virtual reality (VR), augmented reality (AR), and mixed reality (MR) have become one of the key points of the research and development of new generation display technologies, and the head-mounted augmented reality stereo vision optical film is one of the measures for implementing the technologies.

SUMMARY

The disclosure provides a head-mounted augmented reality stereo vision optical film, which can present corresponding stereo vision imaging.

The head-mounted augmented reality stereo vision optical film of the disclosure includes a light-transmitting display layer, an optical projection layer, and an eyeball tracking layer. The light-transmitting display layer has multiple pixel units. The optical projection layer has multiple lens units. One of the lens units is configured to correspond to at least one of the pixel units. The eyeball tracking layer has multiple light-emitting elements and multiple micro-sensing elements. The optical projection layer is located between the light-transmitting display layer and the eyeball tracking layer in a viewing direction of a wearer.

The head-mounted augmented reality stereo vision optical film of the disclosure includes a light-transmitting display layer, an optical projection layer, and an eyeball tracking layer. The light-transmitting display layer has multiple pixel units. The optical projection layer has multiple lens units. One of the lens units is configured to correspond to at least one of the pixel units. The eyeball tracking layer has multiple light-emitting elements and multiple micro-sensing elements. The light-transmitting display layer is located between the optical projection layer and the eyeball tracking layer in a viewing direction of a wearer.

In order for the features and advantages of the disclosure to be more comprehensible, the following specific embodiments are described in detail in conjunction with the accompanying drawings.

BRIEF DESCRIPTION OF THE DRAWINGS

FIG. 4A is a partial side schematic view of a head-mounted augmented reality stereo vision optical film according to an embodiment of the disclosure.

FIG. 5A is a partial side schematic view of a head-mounted augmented reality stereo vision optical film according to an embodiment of the disclosure.

FIG. 5B is a partial side schematic view of a head-mounted augmented reality stereo vision optical film according to an embodiment of the disclosure.

FIG. 6A is a partial side schematic view of a head-mounted augmented reality stereo vision optical film according to an embodiment of the disclosure.

DETAILED DESCRIPTION OF DISCLOSED EMBODIMENTS

Figure 1A:
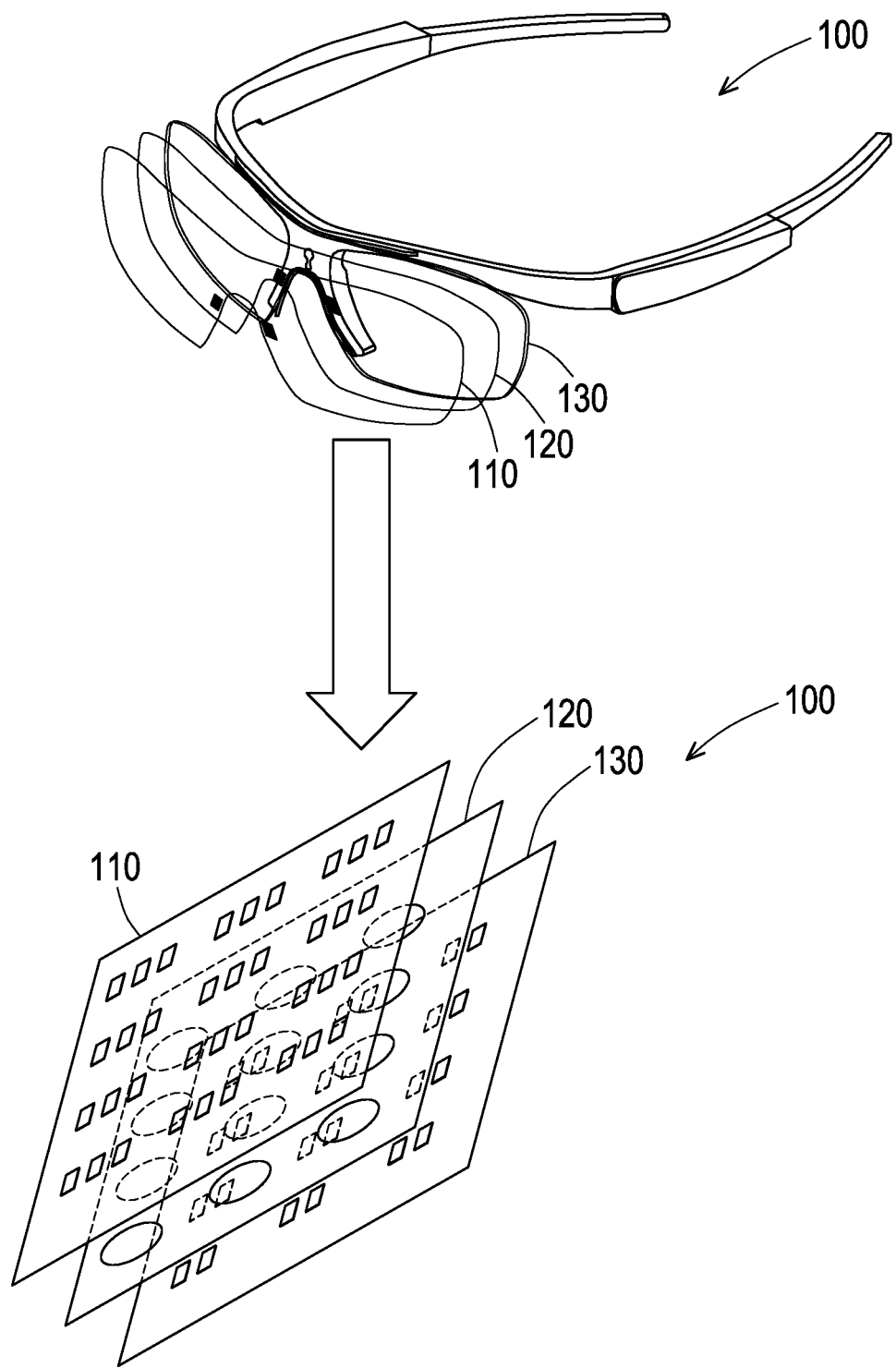
FIG. 1A is a three-dimensional schematic view of a head-mounted augmented reality stereo vision optical film and an application manner thereof according to an embodiment of the disclosure.

In the drawings, the size of some elements, films, or layers may be enlarged or reduced for clarity. In addition, some elements, films, or layers may be omitted or labelled in the drawings for clarity. In addition, a value indicated in the specification may include the value and a deviation value within a deviation range acceptable to persons skilled in the art.

In the following embodiments or corresponding drawings, the same or similar components are indicated by the same or similar reference numerals and have the same or similar functions, and the descriptions are omitted. In addition, elements, films, or layers may not all be labelled or drawn one by one in the drawings for clarity.

Figure 1B:
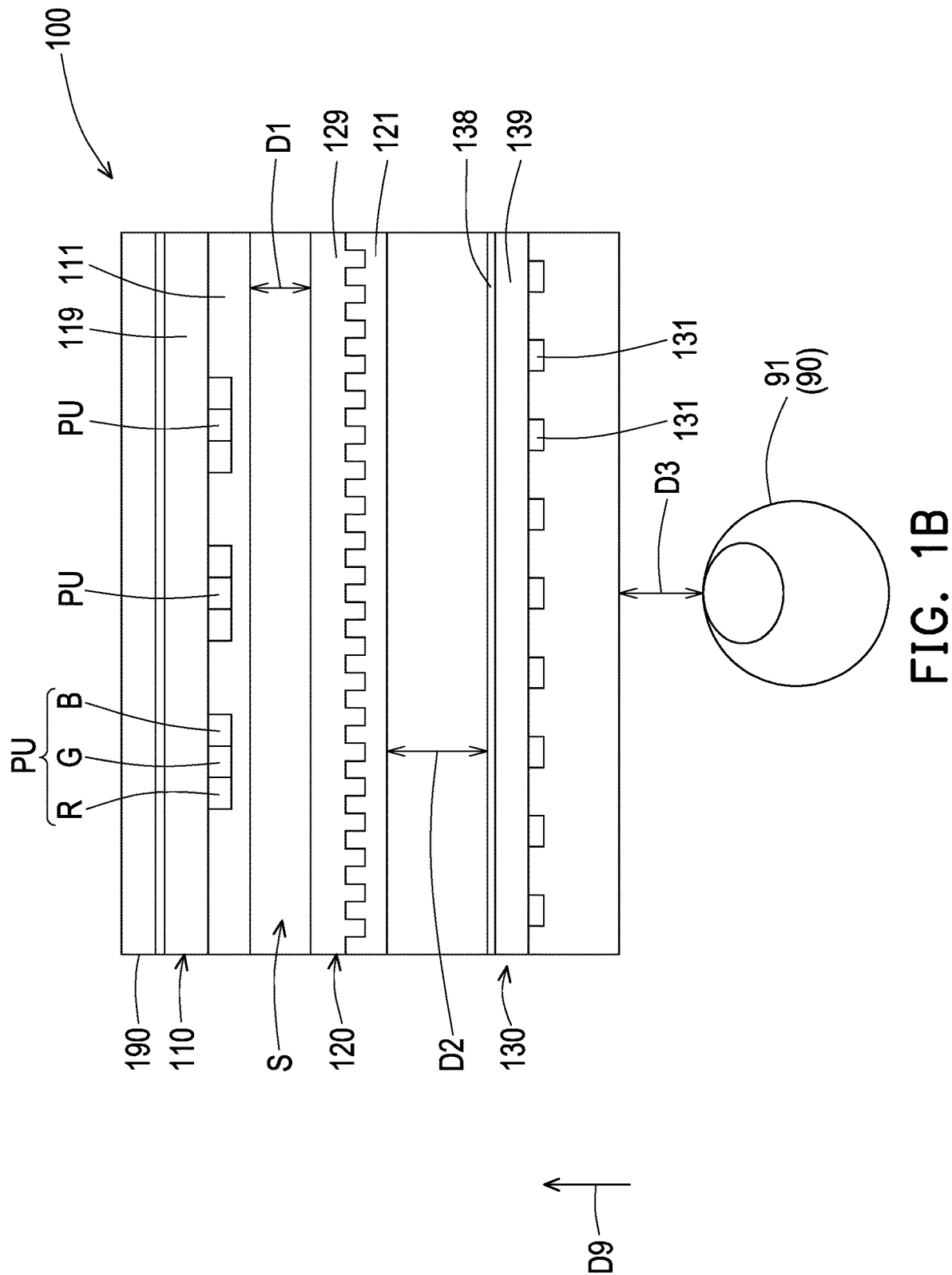
FIG. 1B is a side schematic view of a head-mounted augmented reality stereo vision optical film and an application manner thereof according to an embodiment of the disclosure.

Please refer to FIG. 1A and FIG. 1B. A head-mounted augmented reality stereo vision optical film 100 may be suitable for being integrated with glasses. Therefore, a wearer 90 wears the glasses with the integrated head-mounted augmented reality stereo vision optical film 100 thereon, and views from a viewing direction D9, which can generate an augmented reality stereo vision effect. Therefore, the head-mounted augmented reality stereo vision optical film 100 may also be referred to as a head-mounted augmented reality stereo vision optical film on glasses.

Please refer to FIG. 1A and FIG. 1B. The head-mounted augmented reality stereo vision optical film 100 includes a light-transmitting display layer 110, an optical projection layer 120, and an eyeball tracking layer 130, and the three layers are stacked on one another. The light-transmitting display layer 110 has multiple pixel units PU. The optical projection layer 120 has multiple lens units 121. One of the lens units 121 is configured to correspond to at least one of the pixel units PU. The eyeball tracking layer 130 has multiple micro-sensing elements 131.

In an embodiment, the lens unit 121 may include a reflection member, a refraction member, and/or other suitable lens members. For example, the lens 121 may be a metalens or a metasurface with a nano-microstructure. In an embodiment, the material of the lens unit 121 may include gallium nitride (GaN), silicon nitride (SiN), or titanium dioxide ($TiO_2$), but the disclosure is not limited thereto.

In an exemplary application manner, the head-mounted augmented reality stereo vision optical film 100 may be applied to smart glasses, virtual reality equipment, augmented reality equipment, or mixed reality equipment, etc., but the disclosure is not limited thereto.

In the embodiment, in the viewing direction D9 of the wearer 90, the optical projection layer 120 is located between the light-transmitting display layer 110 and the eyeball tracking layer 130, but the disclosure is not limited thereto.

In the embodiment, there is a first distance D1 between the light-transmitting display layer 110 and the optical projection layer 120, there is a second distance D2 between the optical projection layer 120 and the eyeball tracking layer 130, there is a viewing distance D3 between the head-mounted augmented reality stereo vision optical film 100 and an eyeball 91, and the viewing distance D3 may be greater than the first distance D1 or the second distance D2.

In an embodiment, the first distance D1 or the second distance D2 may be less than 5 centimeters (cm) or in a fully fitted state. The viewing distance D3 may be adjusted according to habits of the wearer 90, which is not limited and difficult to limit in the disclosure. The recommended viewing distance D3 is at least 1 cm to 3 cm.

In an embodiment, two opposite sides of the optical projection layer 120 may be respectively in contact with the light-transmitting display layer 110 and the eyeball tracking layer 130. In other words, the first distance D1 and the second distance D2 are 0 cm.

In an embodiment, the optical projection layer 120 and the light-transmitting display layer 110 may be in contact with each other by an adhesive layer on the optical projection layer 120 and/or an adhesive layer on the light-transmitting display layer 110 to be in fitted contact with each other. Similarly, the optical projection layer 120 and the eyeball tracking layer 130 may be in contact with each other by an adhesive layer on the optical projection layer 120 and/or an adhesive layer on the eyeball tracking layer 130 to be in fitted contact with each other. However, the disclosure is not limited thereto.

In an embodiment, the light-transmitting display layer 110, the optical projection layer 120, and the eyeball tracking layer 130 may be in close contact with each other by a sealant located on sides thereof.

For example, the light-transmitting display layer 110, the optical projection layer 120, and the eyeball tracking layer 130 may be fitted to one another and fixed on a frame 190, and precise alignment and gluing are required during a fitting process, but the disclosure is not limited thereto. In other words, for the glasses with the head-mounted augmented reality stereo vision optical film 100 integrated thereon, the visual appearance may be roughly the same as or similar to ordinary glasses. Therefore, the glasses with the head-mounted augmented reality stereo vision optical film 100 may be more suitable for wearing and/or using by the wearer 90.

In an embodiment, the form or material of the frame 190 may be adjusted according to design requirements, which is not limited in the disclosure. The frame 190 may be integrally formed or a combination of multiple components, which is not limited in the disclosure.

In the embodiment, the light-transmitting display layer 110 may further include a substrate 119. The substrate 119 may include a light-transmitting substrate. The substrate 119 may include a hard substrate (such as glass or hard plastic, but not limited thereto) and a flexible substrate (such as a polyimide (PI) film, a polyethylene terephthalate (PET) film, or other similar polymer films, but not limited thereto), wherein the substrate contains a driving circuit structure of the display layer, which may be a low temperature poly-silicon thin film transistor (LTPS-TFT), a miniature driver integrated circuit (IC), etc. The pixel unit PU may be configured on the substrate 119, and the pixel unit PU on the substrate 119 may face the wearer 90.

In an embodiment, each pixel unit PU may include corresponding first subpixel unit R, second subpixel unit G, and third subpixel unit B.

Figure 2:
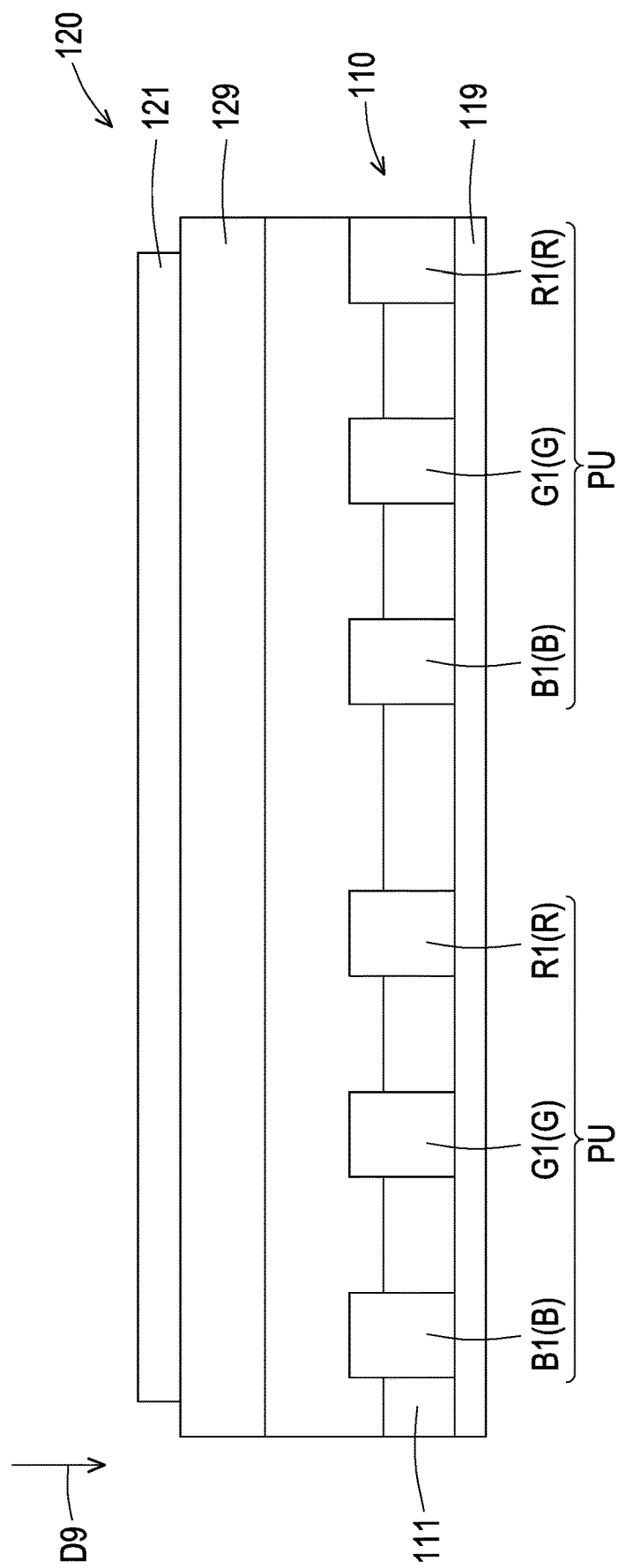
FIG. 2 is a partial side schematic view of a head-mounted augmented reality stereo vision optical film according to an embodiment of the disclosure.

As shown in FIG. 2, in an embodiment, the first subpixel unit R may include a red light-emitting diode R1, the second subpixel unit G may include a green light-emitting diode G1, and the third subpixel unit B may include a blue light-emitting diode B1, but the disclosure is not limited thereto.

In an embodiment, there may be an optical encapsulation layer 111 between the light-emitting diodes, but the disclosure is not limited thereto.

In an embodiment, the manner of forming the first subpixel unit R, the second subpixel unit G, or the third subpixel unit B may include color conversion, nanorod, and other manners known by persons skilled in the art.

In an embodiment, the light-emitting diode (such as the light-emitting diode B1, B2, R1, or G1) may include a micro light-emitting diode (pLED) with a size of basically (5 micrometers (μm) to 100 μm)×(5 μm to 100 μm), but the disclosure is not limited thereto.

In an embodiment, the light-transmitting display layer 110 may further include an element layer (not shown). The element layer may be located on the substrate 119. The element layer may include a driving circuit and/or a corresponding line. The driving circuit may include a corresponding active element (such as a thin film transistor) and/or a corresponding passive element (such as a capacitor). The light-emitting diode may be electrically connected to the corresponding line by a suitable manner (such as flip-chip bonding, but not limited thereto) and may be further electrically connected to a driving circuit by the corresponding line.

In an embodiment, the driving circuit may be electrically connected to a control unit 140 (labeled in FIG. 4A or FIG. 4B) by the corresponding line. In this way, the light-emitting diode may be controlled by the corresponding control unit 140 to emit light, but the disclosure is limited thereto.

In an embodiment, a region S between the light-transmitting display layer 110 and the optical projection layer 120 may have an adhesive layer, an air gap, and/or a pixel light-blocking layer, but the disclosure is not limited thereto.

In the embodiment, the optical projection layer 120 may further include a substrate 129. The substrate 129 may transmit light. The substrate 129 may include a hard substrate (such as glass, hard plastic, or sapphire, but not limited thereto), a flexible substrate, or a material that transmits visible light and has a high refractive index. The lens unit 121 may be configured on the substrate 129.

Figure 3:
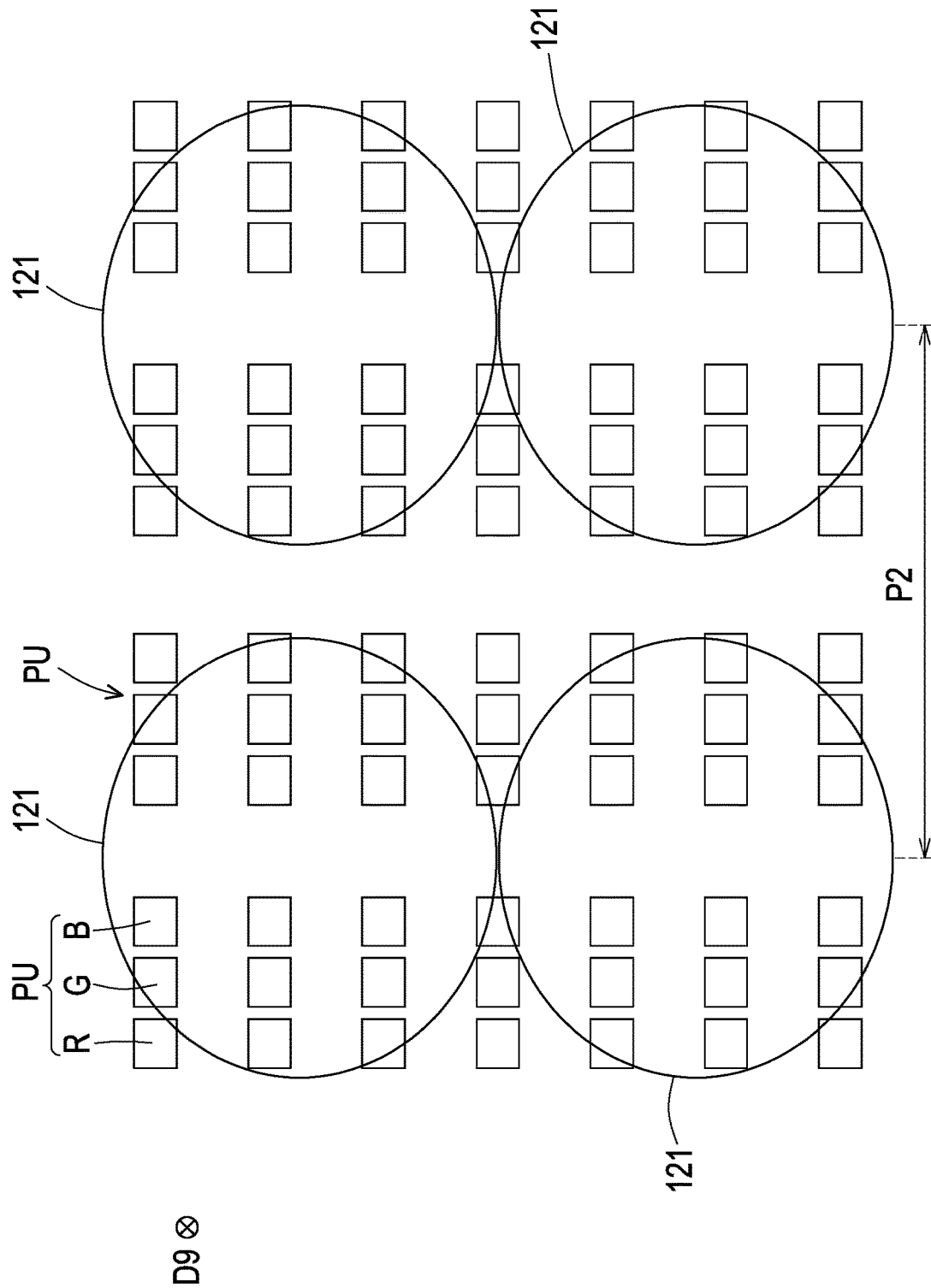
FIG. 3 is a partial top schematic view of a head-mounted augmented reality stereo vision optical film according to an embodiment of the disclosure.

In FIG. 3 or other similar drawings, only one lens unit 121 is exemplarily shown, but the disclosure is not limited thereto.

Please refer to FIG. 3. In the embodiment, one lens unit 121 is configured to correspond to multiple pixel units PU, but the disclosure is not limited thereto. In an embodiment not shown, one lens unit similar to the lens unit 121 may be configured to correspond to one pixel unit PU. In addition, the pixel units PU are not all labelled one by one in FIG. 3 for clarity.

In an embodiment, there may be an adhesive layer and/or an air gap between the optical projection layer 120 and the eyeball tracking layer 130, but the disclosure is not limited thereto.

In the embodiment, the eyeball tracking layer 130 may further include a substrate 139. The substrate 139 may transmit light. The micro-sensing element 131 may be configured on the substrate 139. In addition, the micro-sensing elements 131 are not all labeled one by one in FIG. 1A or FIG. 1B for clarity.

In an embodiment, the substrate 139 may include a hard substrate (such as glass or hard plastic, but not limited thereto) or a flexible substrate (such as a polyimide film, a polyethylene terephthalate film, or other similar polymer films, but not limited thereto), but the disclosure is not limited thereto.

In an embodiment, the micro-sensing element 131 may include a reverse-biased light-emitting diode, a photodiode (PD), or a photosensitive element under a plane optical layer (such as Mura pattern mask, but not limited thereto) with a diffraction pattern. After irradiating the eyeball 91 of the wearer 90 with a tracking beam, corresponding reflection may be generated in a corresponding region or direction according to a corresponding tissue (such as iris, pupil, lens, and cornea) of the eyeball. For example, under the irradiation of tracking beams with basically the same wavelength, the tissue of the eyeball may have light reflections in different directions and/or intensities at different places. In this way, the micro-sensing element 131 may receive the tracking beam (which may be referred to as a reflected beam) reflected by the eyeball 91 of the wearer 90, so that the movement of the eyeball 91 may be tracked.

In an embodiment, the size of the reverse-biased light-emitting diode or the photodiode may be less than 250 μm×250 μm, but the disclosure is not limited thereto.

In an embodiment, a distance P3 between two adjacent micro-sensing elements 131 (that is, a distance between midpoints of the two micro-sensing elements 131) may be between 0.1 millimeters (mm) and 20 mm, but the disclosure is not limited thereto.

Figure 4B:
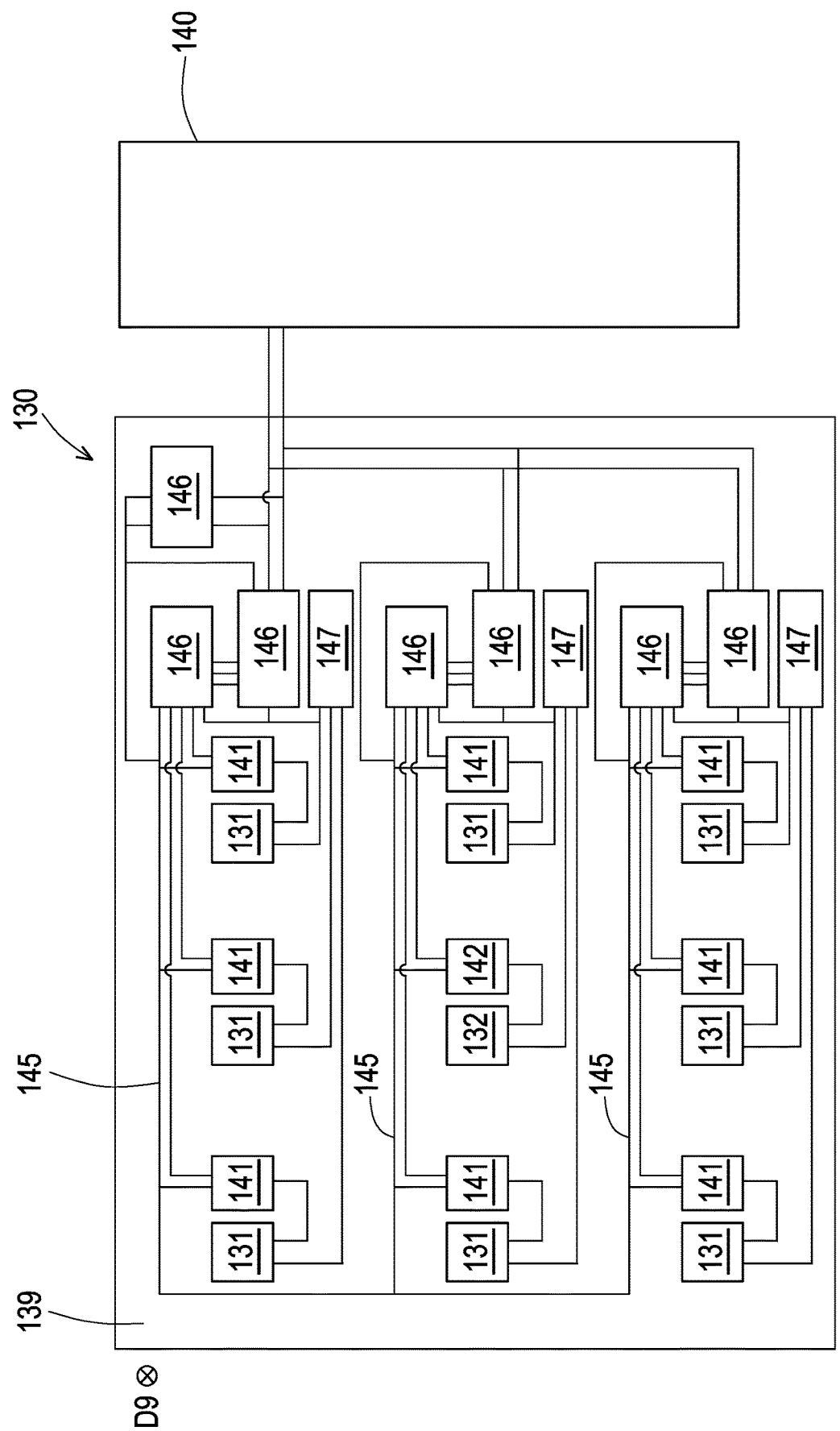
FIG. 4B is a partial top schematic view of a head-mounted augmented reality stereo vision optical film according to an embodiment of the disclosure.

In an embodiment, as shown in FIG. 4B, the tracking beam may be an actively-controlled light source. For example, the eyeball tracking layer 130 may further include at least one light-emitting element 132 configured on the substrate 139. The light-emitting element 132 is suitable for directly or indirectly emitting the tracking beam to the eyeball 91 of the wearer 90. The tracking beam that can be emitted by the light-emitting element 132 includes, for example, infrared light or other suitable rays that are invisible to the wearer 90 and/or less harmful to the tissue of the eyeball 91. The luminous of the tracking beam may be adjusted according to design requirements and needs to comply with biological safety regulations, which is not limited in the disclosure.

As shown in FIG. 4A or FIG. 4B, in an embodiment, the eyeball tracking layer 130 may further include an element layer 133. The element layer 133 may be located on the substrate 139. The element layer 133 may include an emitter circuit 142, a sensor circuit 141, and/or a corresponding line 145.

As shown in FIG. 4B, in an embodiment, the emitter circuit 142 or the sensor circuit 141 may include a corresponding active element and/or a corresponding passive element. The emitter circuit 142 may be electrically connected to the light-emitting element 132 by the corresponding line 145 and/or the sensor circuit 141 may be electrically connected to the micro-sensing element 131 by the corresponding line 145.

It is worth noting that, in some side schematic views (or also referred to as cross-sectional views, such as FIG. 1B or FIG. 4A), the light-emitting element 132 may not be shown. However, the light-emitting element 132 may be seen in other side-view directions or other cross-sections.

In an embodiment, the emitter circuit 142 and/or the sensor circuit 141 may be electrically connected to a corresponding chip 146 and/or terminal 147 by the corresponding line 145. The chip 146 may include a current IC, a voltage IC, an amplifier IC (AMP IC), an analog/digital conversion IC, or other suitable integrated circuits. Multiple of the integrated circuits may be integrated on the same chip or may respectively belong to different chips. The terminal 147 may include a power terminal, a common terminal, or a ground terminal.

In an embodiment, the chip 146 and/or the terminal 147 may be electrically connected to the control unit 140 by the corresponding line 145. The control unit 140 may include an embedded system, a microcontroller (MCU), and/or an application specific integrated circuit (ASIC), but the disclosure is not limited thereto.

In an embodiment, the width of the line 145 may be less than 10 μm, and/or the material of the line 145 may include zinc oxide (ZnO), tin oxide (SnO), indium-zinc oxide IZO), gallium-zinc oxide (GZO), zinc-tin oxide (ZTO), indium-tin oxide (ITO), other suitable light-transmitting conductive materials, or other materials with good conductivity such as gold, but the disclosure is not limited thereto.

In an embodiment, the eyeball tracking layer 130 may further include an anti-reflection coating layer 138, but the disclosure is not limited thereto. The anti-reflection coating layer 138 may be located on the substrate 139. The anti-reflection coating layer 138 may be a single film or layer or a stack of multiple films or layers, which is not limited in the disclosure.

In an embodiment, as shown in FIG. 5A or FIG. 5B, the eyeball tracking layer 130 may further include a light-shape control layer 135. The light-shape control layer 135 may cover the micro-sensing element 131. The light-shape control layer 135 may reduce a beam angle. In this way, the signal-to-noise ratio (SNR or S/N) of the micro-sensing element 131 may be improved.

Taking FIG. 5A as an example, a light-shape control layer 135*a* (a type of the light-shape control layer 135) may be a sheet film or layer, and the light-shape control layer 135*a* may cover the micro-sensing elements 131.

Taking FIG. 5B as an example, a light-shape control layer 135*b* (a type of the light-shape control layer 135) may be a patterned and/or separated film or layer, and each light-shape control layer 135b may cover the corresponding micro-sensing element 131.

In the embodiment, the micro-sensing elements 131 are suitable for sensing the eyeball 91 of the wearer 90. In addition, sensing signals of the micro-sensing elements 131 may be computed by the control unit 140, so that the pixel units PU may emit a corresponding image beam. The image beam may be viewed by the wearer 90 after being guided by the light guiding units 121. In addition, by the computation of the control unit 140, the image beam may basically correspond to a natural focus image of the eyeball of human stereo vision. In other words, compared with a conventional stereo vision image generated by using multiple polarizers for left and right eyes of a viewer to see different polarized light, the head-mounted augmented reality stereo vision optical film 100 of the embodiment enables a stereo vision image seen by the wearer 90 to be more natural and/or a viewing process to be more comfortable.

In the embodiment, within a unit area, the number of micro-sensing elements 131 is less than the number of pixel units PU or the number of lens units 121. In an embodiment, within the unit area, the number of lens units 121 is less than or equal to the number of pixel units PU.

In an embodiment, within the unit area, the number of pixel units PU or the number of lens units 121 is much greater than the number of micro-sensing elements 131. For example, the number of pixel units PU or the number of lens units 121 is at least 100 times the number of micro-sensing elements 131.

As shown in FIG. 6A, in an embodiment, in the viewing direction D9 of the wearer 90, the micro-sensing element 131 may overlap with the pixel unit PU or the lens unit 121, but the disclosure is not limited thereto.

Figure 6B:
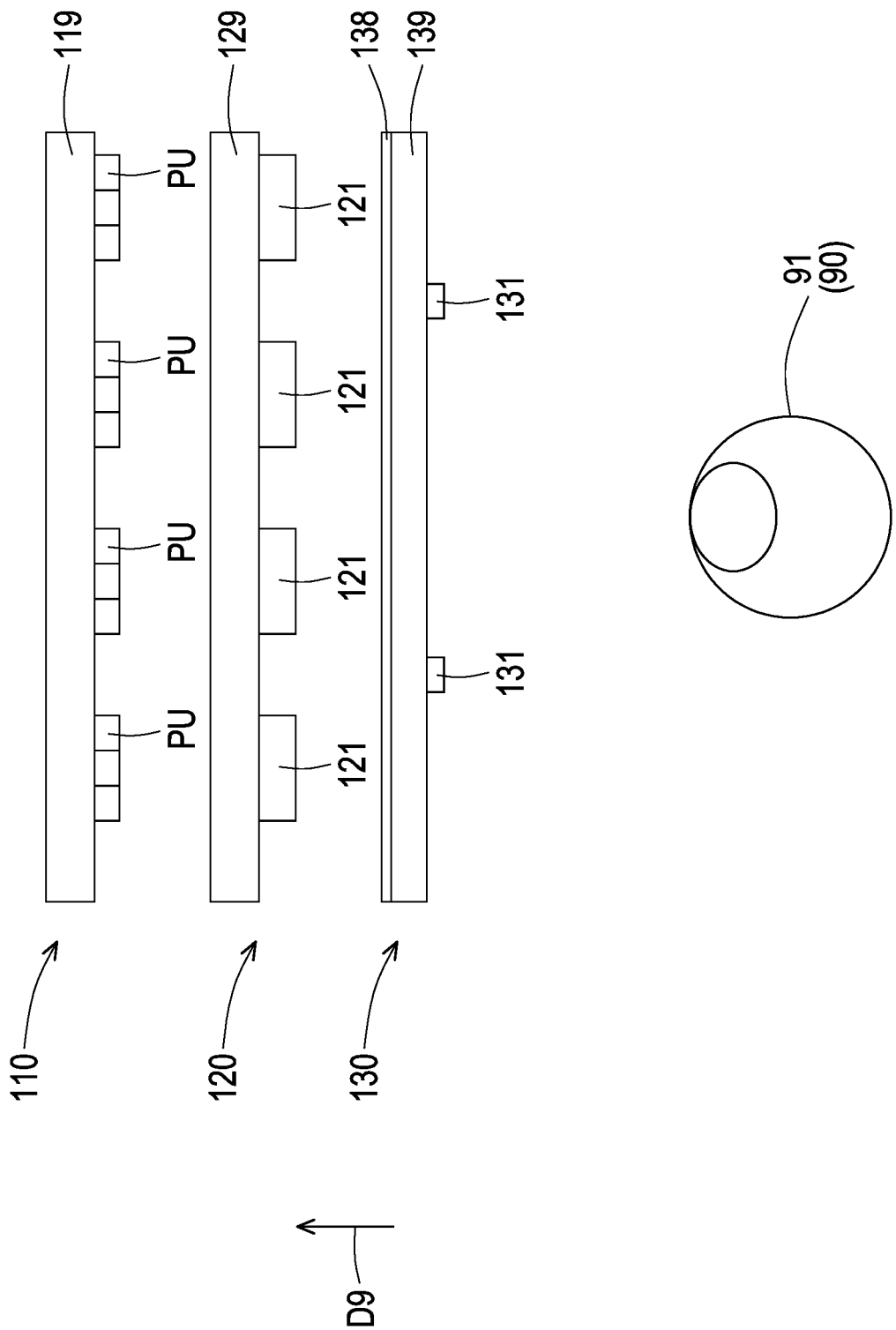
FIG. 6B is a partial side schematic view of a head-mounted augmented reality stereo vision optical film according to an embodiment of the disclosure.

As shown in FIG. 6B, in an embodiment, in the viewing direction D9 of the wearer 90, the micro-sensing element 131 may not overlap with or may be far away from the pixel unit PU or the lens unit 121.

Figure 7A:
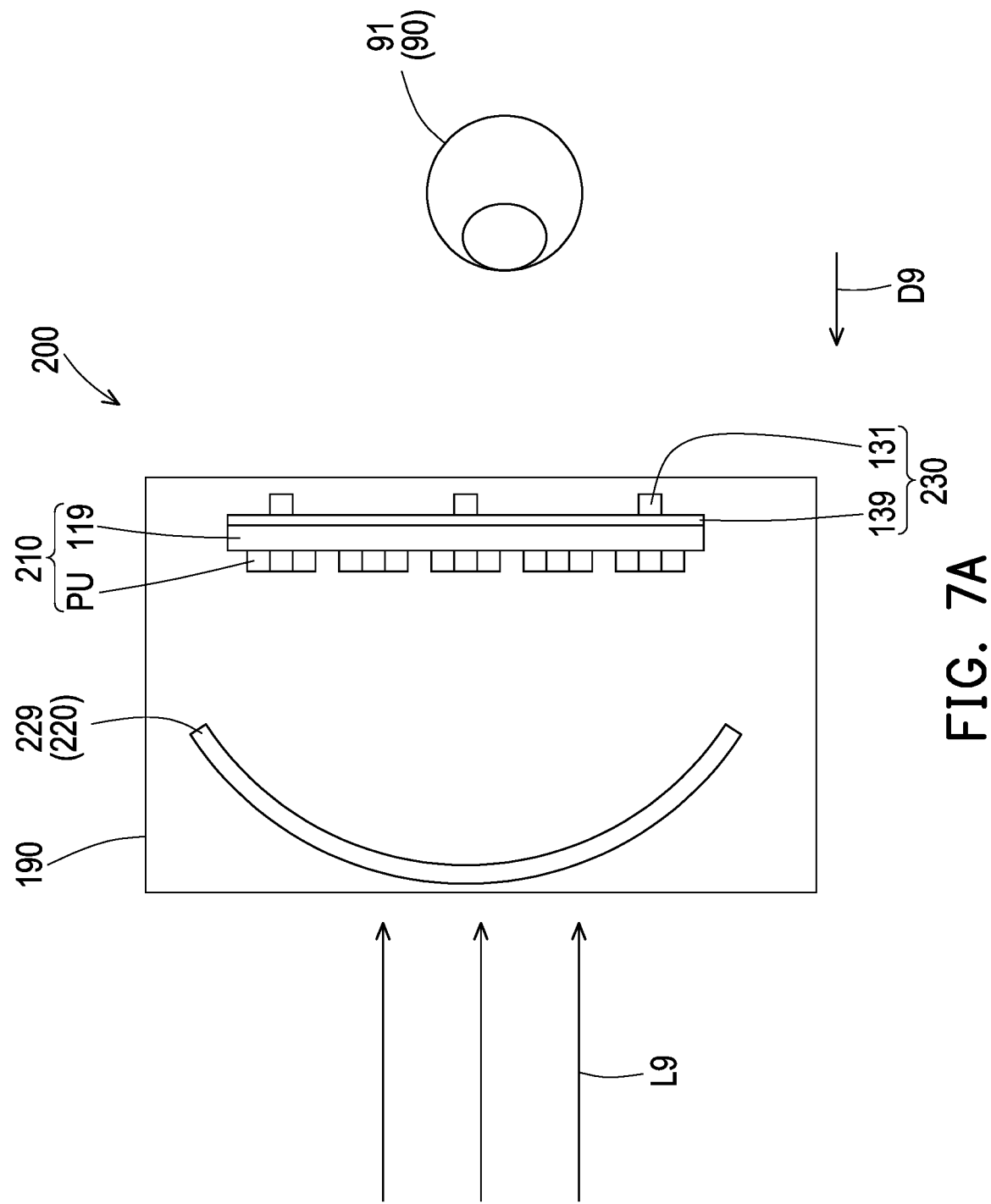
FIG. 7A is a side schematic view of a head-mounted augmented reality stereo vision optical film and an application manner thereof according to an embodiment of the disclosure.

FIG. 7A is a side schematic view of a head-mounted augmented reality stereo vision optical film and an application manner thereof according to an embodiment of the disclosure.

In the embodiment, a head-mounted augmented reality stereo vision optical film 200 includes a light-transmitting display layer 210, an optical projection layer 220, and an eyeball tracking layer 230. The light-transmitting display layer 210 may be the same as or similar to the light-transmitting display layer 110 of the foregoing embodiment. The optical projection layer 220 may be similar to the optical projection layer 120 of the foregoing embodiment. The eyeball tracking layer 230 may be the same as or similar to the eyeball tracking layer 130 of the foregoing embodiment.

In the embodiment, in the viewing direction D9 of the wearer 90, the light-transmitting display layer 210 is located between the optical projection layer 220 and the eyeball tracking layer 230.

In the embodiment, in the light-transmitting display layer 210, the pixel unit PU on the substrate 119 may face the optical projection layer 220. The substrate 229 of the optical projection layer 220 may at least reflect light emitted by the pixel unit PU, so that the light reflected by the substrate 229 may be directed toward the wearer 90.

In the embodiment, the substrate 229 may be a transflective substrate. For example, the substrate 229 may partially reflect the light emitted by the pixel unit PU, and the substrate 229 may allow a portion of an ambient light L9 to pass through.

In the embodiment, a surface of the substrate 229 facing the wearer 90 may include a curved surface.

In an embodiment, by an architecture the same as or similar to FIG. 7A, the optical projection layer 220 may not have a metalens with a nano-microstructure. For example, in the architecture the same as or similar to FIG. 7A, the substrate 229 may be used to reflect rays, so that the optical projection layer 220 may omit the metalens with a nano-microstructure.

Figure 7B:
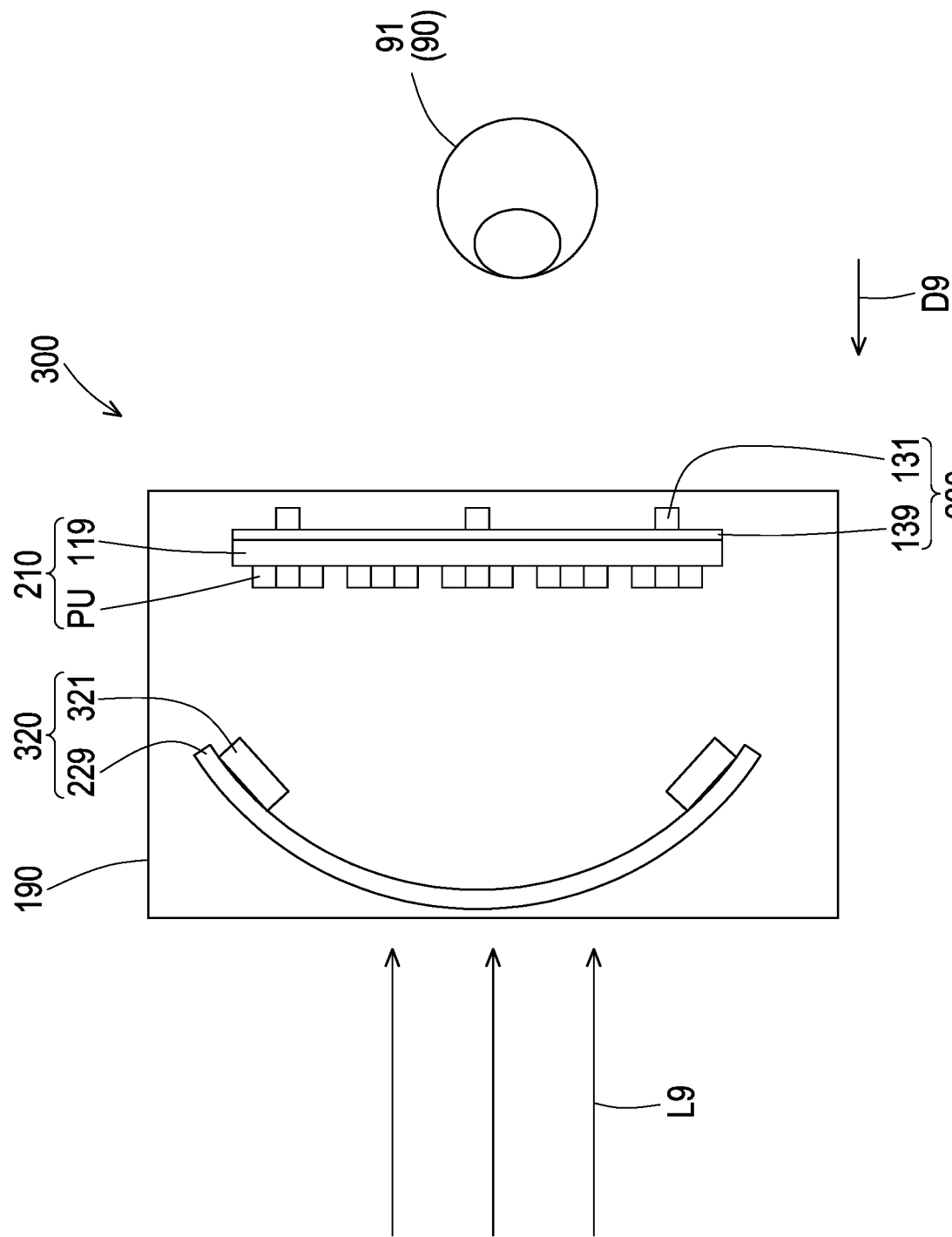
FIG. 7B is a side schematic view of a head-mounted augmented reality stereo vision optical film and an application manner thereof according to an embodiment of the disclosure.

FIG. 7B is a side schematic view of a head-mounted augmented reality stereo vision optical film and an application manner thereof according to an embodiment of the disclosure. The difference from the head-mounted augmented reality stereo vision optical film 200 of FIG. 7A lies in the setting of a metalens of an optical projection layer 320 in a head-mounted augmented reality stereo vision optical film 300.

In the embodiment, the optical projection layer 320 may further include an optical microstructure 321. The optical microstructure 321 may be configured on an edge of the substrate 229. The optical microstructure 321 may reduce visual parallax.

In an embodiment, the optical microstructure 321 may be a metalens or a metasurface with a nano-microstructure, but the disclosure is not limited thereto.

Figure 7C:
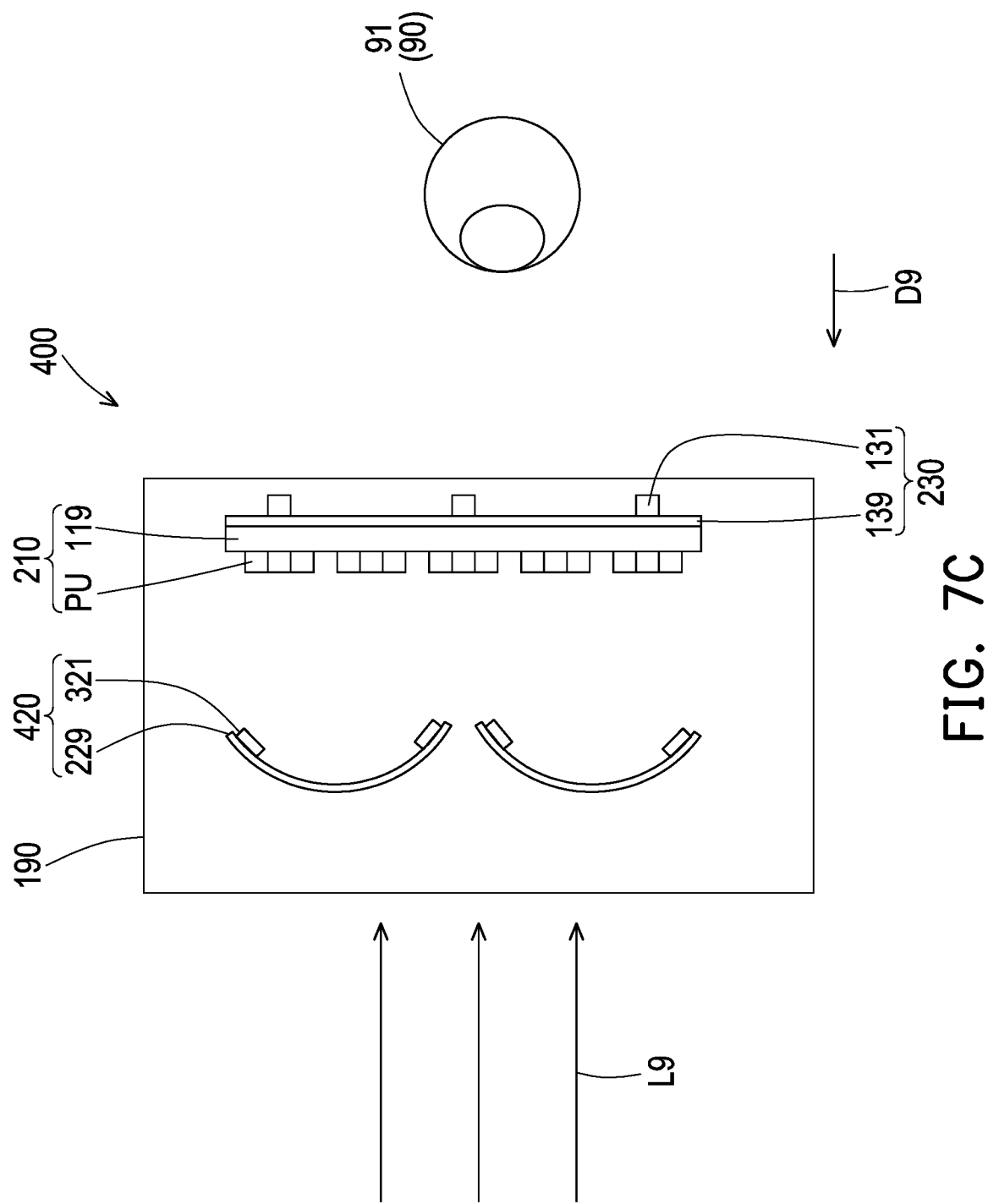
FIG. 7C is a side schematic view of a head-mounted augmented reality stereo vision optical film and an application manner thereof according to an embodiment of the disclosure.

FIG. 7C is a side schematic view of a head-mounted augmented reality stereo vision optical film and an application manner thereof according to an embodiment of the disclosure. The difference from the head-mounted augmented reality stereo vision optical film 300 of FIG. 7B lies in the setting manner of an optical projection layer 420 in a head-mounted augmented reality stereo vision optical film 400.

In the embodiment, the optical projection layer 420 may have multiple curved surfaces. For example, the number of substrates 229 may be multiple, and the corresponding optical microstructure 321 may be configured on each substrate 229.

Based on the above, in the head-mounted augmented reality stereo vision optical film of the disclosure, the light-transmitting display layer can have higher resolution, higher brightness, higher transparency, and/or higher endurance; the optical projection layer can have a wider field of view and/or higher efficiency; and/or the eyeball tracking layer can have a better human machine interface (HMI), lower power consumption, smaller volume, and/or better integration. Moreover, by the stacking integration of the light-transmitting display layer, the optical projection layer, and the eyeball tracking layer, the head-mounted augmented reality stereo vision optical film can be lighter and thinner, have higher efficiency, wider viewing angle, and/or better interactive scenario.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A head-mounted augmented reality stereo vision optical film, comprising:
   a light-transmitting display layer, having a plurality of pixel units;
   an optical projection layer, having a plurality of lens units, wherein one of the lens units is configured to correspond to at least one of the pixel units; and an eyeball tracking layer, having a plurality of micro-sensing elements, wherein in a viewing direction of a wearer, the optical projection layer is located between the light-transmitting display layer and the eyeball tracking layer, and the eyeball tracking layer is located between the wearer and the optical projection layer, wherein the micro-sensing elements are suitable for sensing an eyeball of the wearer;

wherein there is a first distance between the light-transmitting display layer and the optical projection layer, there is a second distance between the optical projection layer and the eyeball tracking layer, there is a viewing distance between the head-mounted augmented reality stereo vision optical film and the eyeball, and the viewing distance is greater than the first distance or the second distance.

2. The head-mounted augmented reality stereo vision optical film according to claim 1, wherein the first distance and the second distance are 0.

3. The head-mounted augmented reality stereo vision optical film according to claim 1, wherein the light-transmitting display layer, the optical projection layer, and the eyeball tracking layer are stacked on one another.

4. The head-mounted augmented reality stereo vision optical film according to claim 1, wherein within a unit area, a number of the micro-sensing elements is less than a number of the pixel units or a number of the lens units.

5. The head-mounted augmented reality stereo vision optical film according to claim 4, wherein the number of the pixel units or the number of the lens units within the unit area is more than 100 times the number of the micro-sensing elements.

6. The head-mounted augmented reality stereo vision optical film according to claim 1, wherein the eyeball tracking layer comprises a light-shape control layer located on the micro-sensing elements.

7. The head-mounted augmented reality stereo vision optical film according to claim 1, wherein the optical projection layer comprises a light-transmitting substrate.

8. The head-mounted augmented reality stereo vision optical film according to claim 1, wherein the eyeball tracking layer further comprises an anti-reflection coating layer.

9. The head-mounted augmented reality stereo vision optical film according to claim 1, further comprising:
a control unit, wherein the eyeball tracking layer further comprises an element layer electrically connected to the control unit.

10. The head-mounted augmented reality stereo vision optical film according to claim 1, wherein the lens unit is a metalens.

11. A head-mounted augmented reality stereo vision optical film, comprising:
a light-transmitting display layer, having a plurality of pixel units;
an optical projection layer, having a plurality of lens units, wherein one of the lens units is configured to correspond to at least one of the pixel units; and
an eyeball tracking layer, having a plurality of micro-sensing elements, wherein in a viewing direction of a wearer, the light-transmitting display layer is located between the optical projection layer and the eyeball tracking layer, and the eyeball tracking layer is located between the wearer and the light-transmitting display layer, wherein the micro-sensing elements are suitable for sensing an eyeball of the wearer;

wherein there is a first distance between the light-transmitting display layer and the optical projection layer, there is a second distance between the optical projection layer and the eyeball tracking layer, there is a viewing distance between the head-mounted augmented reality stereo vision optical film and the eyeball, and the viewing distance is greater than the first distance or the second distance.

12. The head-mounted augmented reality stereo vision optical film according to claim 11, wherein the optical projection layer comprises a transflective substrate.

13. The head-mounted augmented reality stereo vision optical film according to claim 12, wherein a surface of the transflective substrate facing the wearer comprises a curved surface.

14. The head-mounted augmented reality stereo vision optical film according to claim 12, wherein the optical projection layer further comprises an optical microstructure configured on an edge of the transflective substrate.

15. The head-mounted augmented reality stereo vision optical film according to claim 12, wherein the light-transmitting display layer and the eyeball tracking layer are stacked on each other.

16. A head-mounted augmented reality stereo vision optical film, comprising:
a light-transmitting display layer, having a plurality of pixel units;
an optical projection layer, having a plurality of lens units, wherein one of the lens units is configured to correspond to at least one of the pixel units; and
an eyeball tracking layer, having a plurality of micro-sensing elements, wherein in a viewing direction of a wearer, the eyeball tracking layer is the one closest to the wearer among the light-transmitting display layer, optical projection layer and eyeball tracking layer, wherein the micro-sensing elements are suitable for sensing an eyeball of the wearer;

wherein there is a first distance between the light-transmitting display layer and the optical projection layer, there is a second distance between the optical projection layer and the eyeball tracking layer, there is a viewing distance between the head-mounted augmented reality stereo vision optical film and the eyeball, and the viewing distance is greater than the first distance or the second distance.

* * * * *